July 12, 1966  R. F. WONNEMAN  3,260,403
APPARATUS FOR SELECTING AND ALIGNING RANDOM ARTICLES
Filed May 31, 1963  3 Sheets-Sheet 1
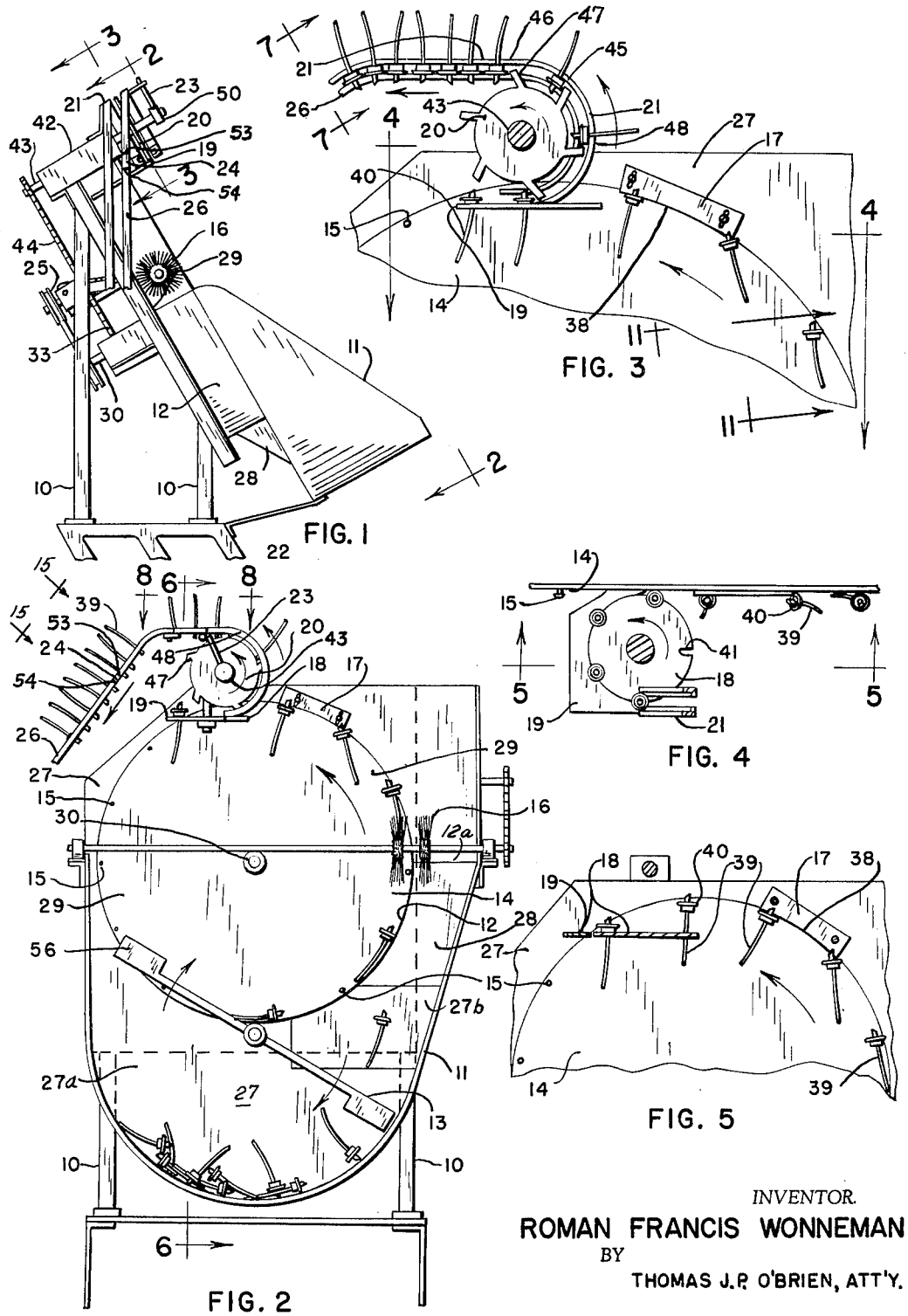
INVENTOR.
ROMAN FRANCIS WONNEMAN
BY
THOMAS J. P. O'BRIEN, ATT'Y.

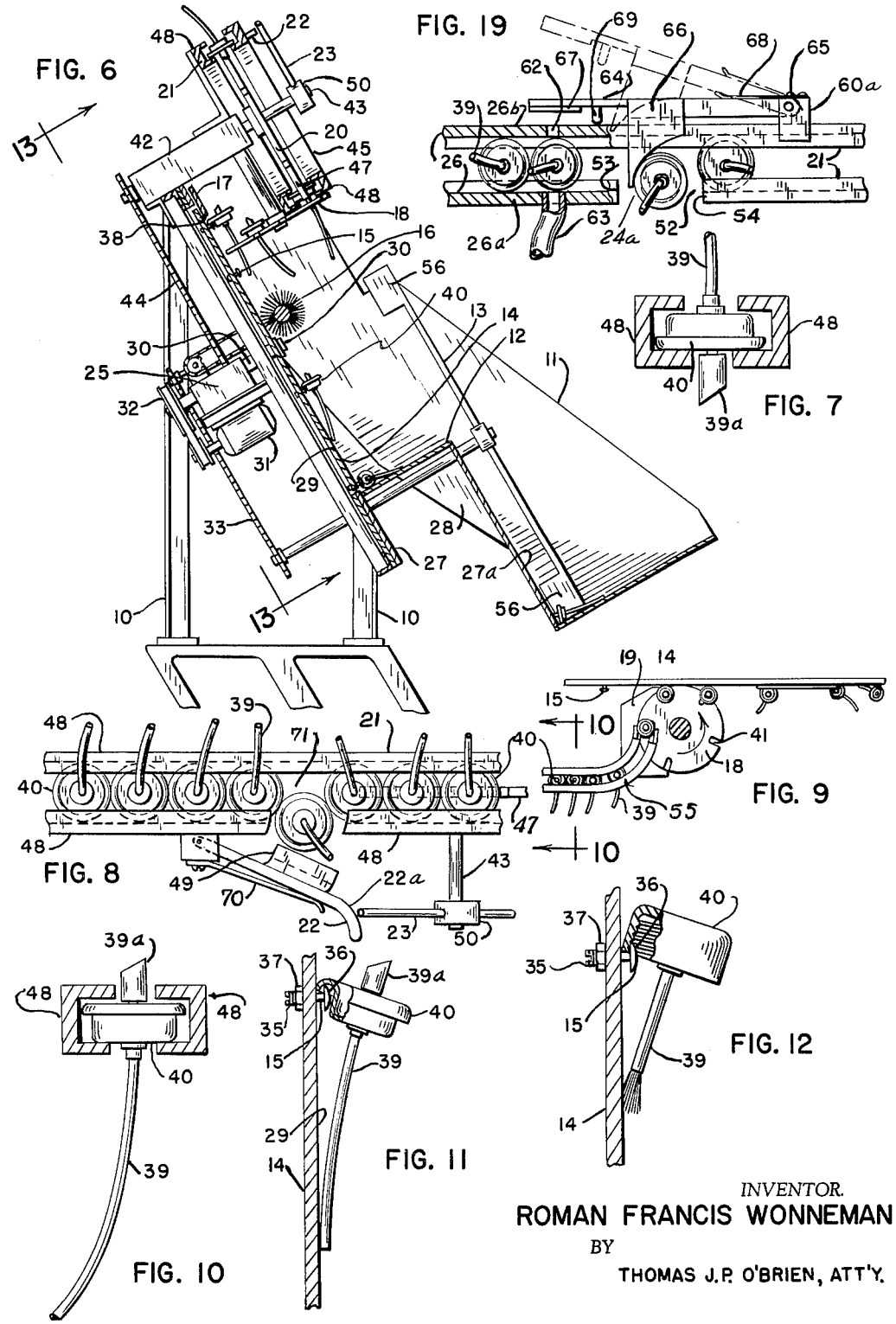

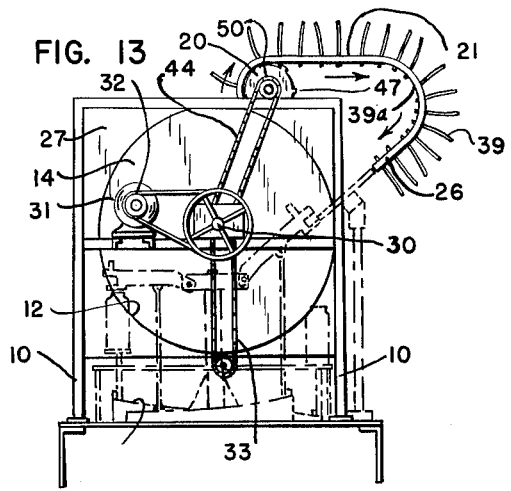
FIG. 13
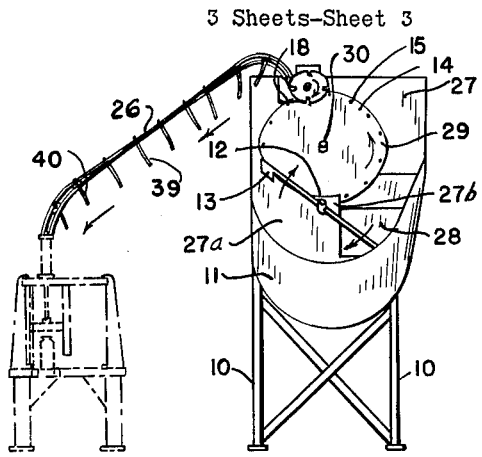
FIG. 14
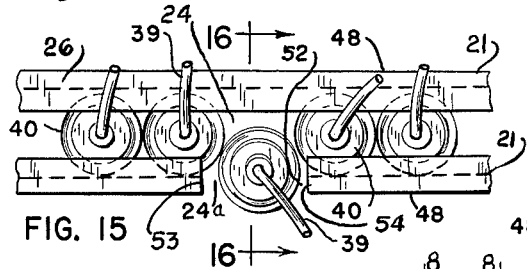
FIG. 15
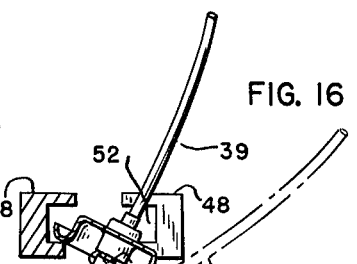
FIG. 16
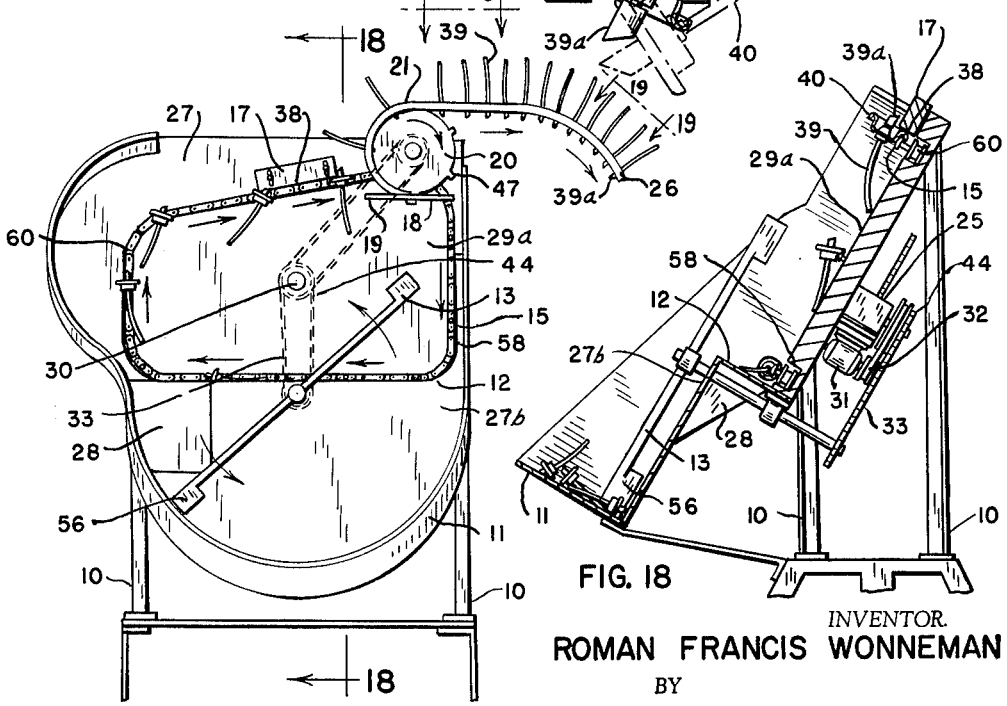
FIG. 17
FIG. 18
INVENTOR.
ROMAN FRANCIS WONNEMAN
BY
THOMAS J.P. O'BRIEN, ATT'Y.

United States Patent Office 3,260,403
Patented July 12, 1966

3,260,403
APPARATUS FOR SELECTING AND ALIGNING RANDOM ARTICLES
Roman Francis Wonneman, 9621 Harding Ave., Baltimore 34, Md.
Filed May 31, 1963, Ser. No. 284,406
10 Claims. (Cl. 221—10)

This invention relates in general to apparatus for selecting individual articles from a random quantity for the purpose of stacking them in aligned and like positions in a receiver, from which the individual articles are to be manually by gravity, or mechanically removed.

Although the state of the art pertaining to automatic feeding or hoppering mechanisms is well advanced, particularly in the areas of electro-mechanical, mechanical and pneumatic devices for feeding various hardware articles; such as, fasteners, bottle tops, buttons, and others of similar simple construction, each of these types of devices has inherent characteristics, some of which are common to all, which limit their fullest exploitation. The productive operating speeds of the electro-mechanical and pneumatic types of vibratory feeders, for example, are limited when operated with articles that tend to interlock together in a random quantity. Mechanical feeders of the types wherein a random quantity of articles is exposed to a rotating disc having apertures, slots, or magnets on its surface or in its periphery, are severely limited to operating with articles of well defined and consistent shape, or with articles having specific materials of construction, and with articles of a comparatively sturdy construction sufficient to withstand the severe agitations inherently required in these types of feeding devices. Mechanical feeding devices having magnets in spaced relation on a rotating disc in surface contact with a random quantity of articles to magnetically attract individual ones from said quantity, are operable only with articles constructed of magnetically permeable materials, and are usually further equipped with appurtenances designed to offset the effects of residual magnetism imparted to the articles in the random quantity. Other deficiencies in the magnetic types of feeding apparatuses involve foreshortened magnet life resulting from constant exposure of the magnets, or magnetic fields thereof, to repeated random quantities of articles; the tendency for magnets to become contaminated with impurities from the articles handled; and the necessity for finitely calibrating flux strength of the magnets.

Also the use of a single support as a reservoir for the random quantity of articles from which individual ones of said articles are to be selected, as is common to the foregoing types of feeding devices, limits the weight or volume of the said random quantity to the abilities of the vibrating means, or the rotating disc, or the magnets to agitate the random quantity. Also, each of the foregoing devices generally described depends on the exterior peripheral shapes and surfaces of the individual articles as means for capturing individual ones from the random quantity.

A principal object of the present invention therefore is to provide a highly versatile automatic feeding, orienting, and stacking apparatus for use with articles which tend to interlock together in a random quantity; with articles constructed by magnetically permeable or impermeable materials or combinations thereof; and with dimensionally unstable articles.

A further object of this invention is to provide in said apparatus, means for elevating random quantities of such articles from a primary support to a smaller secondary support at a higher level; recirculating passage means wherein excess articles on the secondary support are returned by gravity to the primary support; projecting elements on an elevating means to capture individual articles from the smaller random quantity on the secondary support for elevating said individual articles to a still higher level; means at a higher level than the secondary support for removing more than a single article from each projecting element on said elevating means; means at another higher level for aligning each article on each projecting element into like alignment; means for receiving portions of said article on each projecting element and for operation in timed relation to said elevating means and the projecting elements thereon for receiving remaining portions of said article and for carrying said article away from its projecting element and slidably forcing it into a guide chute; means for inverting said article and for forcing said inverted article into an alignment chute wherein said inverted article descends from the aforesaid higher level to a lower level in a predetermined and determinable path of travel; and means for forcing excess articles from said alignment chute for gravity return of said excess articles to the secondary or primary support.

Ancillary objectives of the present invention will become apparent from the following specifications and accompanying drawings forming part of this application which discloses the best mode of embodying the invention in the form of apparatus for feeding, orienting, and stacking flexible dip tubed closures of the types used on aerosol or pressure cannisters. These types of closures are usually an assembly of various components consisting of a ferrous or non-ferrous metal cap which fits into a container opening, a manually operative valve assembly on the cap, and a curved flexible plastic dip tube extending axially from said cap. The curved flexible dip tube portions of the closure assemblies in a random quantity thereof are generally inconsistent in their arcurate shape, are susceptible to deformation when severely agitated in random quantities or larger quantities, and are frictionally attached to a protruding element on the closure cap. These and other characteristics of an aerosol valve, as this closure unit is usually referred to in the industry, present unusual and unique problems when they are to be mechanically handled in a feeding apparatus for their assembly to cannisters. Aerosol valves tend to interlock together in a random collection of quantities. Severe agitation usually deforms or separates the dip tube portion from the closure cap; or, a valve with a missing dip tube is occasionally found in quantities of valves. Also, according to which pressurizing method is used by the aerosol packager, the manually operative valve button part of the closure assembly, or valve, may be missing from the closure assembly.

The novel features of the present invention render the same ideally suitable for selecting, feeding, orienting and stacking flexible dip tube closures as aforesaid, since the primary support is of unlimited capacity, and the secondary support at a higher level, is of limited capacity. Also, closures not selected from the smaller quantity on the secondary support, by the projecting elements on the elevating means, are returned to the primary support by a gentle gravity action for eventual return to the secondary support. Projecting elements on the elevating means gently agitate the smaller random quantities on the secondary support, to minimize closure damage and to allow each projecting element to interlock with underside recessed circumferential portions of a closure cap for its positive withdrawal from the smaller random quantity, as well as to reject those without dip tubes.

The invention as disclosed here, while ideally suitable to an apparatus for feeding, orienting, and stacking flexible dip tube closures of the types previously described, is not limited in all its aspects solely thereto since many of the advantages in the invention render it suitable for feeding other articles; such as, rigid straight dip tube closures or applicator type closures. In addition, on the drawings, an embodiment is shown wherein the elevating means comprises a substantially vertical or upstanding angularly disposed rotatable disc with the smaller random quantity of articles in gravity contact with the surface thereof, and with the aforesaid projecting elements at circumferentially spaced intervals near the periphery of the disc. The operation of the present invention is not limited in all its aspects to this particular embodiment of elevating means. An endless chain belt, for example, may be used with projecting elements at spaced intervals along the chain in position to move through the random quantity in a predetermined path of travel and, may be substituted for the aforementioned disc as the elevating means. Also, the primary support below the secondary support may be positioned to the right or left of the secondary support rather than directly beneath it. Also the embodiment of the invention as shown on the drawings and described in the specifications inverts the closure assembly so that the dip tube portion thereof is at a higher level than the cap portion thereof after the cap portion is slidably forced into the alignment chute by the inverting means. This embodiment has the important advantage or result of allowing the use of the article feed chute apparatus in closely adjacent superposed relation over a machine to assemble said closures to containers, thereby economizing floor space. When used at a remote distance away from an assembly line or closure assembly machine, the inverting means in the present invention may be omitted from the apparatus for closures to be slidably forced directly into the alignment chute by the timed receiver means without inverting them.

Another object of the present invention is to provide apparatus for operating the elevating means at varying and variable speeds for obtaining somewhat consistent production rates for dip tubed closures having different dip tube lengths.

Still another object of the present invention is to provide apparatus for feeding aligned and like positioned dip tubed closures into an alignment chute, with means in the alignment chute for easily and automatically removing deformed or imperfect closures and with means to periodically mechanically operate said means as a secondary overflow relief portion supplementary to a primary overflow relief portion of said chute.

A related objective to that described in the foregoing is embodied in alternative apparatus on the alignment chute as positive mechanical diverting means for diverting excess closures from their normal path of travel in the alignment chute, for gravity return of said excess closures to the primary or secondary supports, with said diverting means being normally in non-diverting position by the action of pressurized air against said means and whereby closures in the filled alignment chute interrupt the flow of said pressurized air against the diverting means to allow it to interrupt following excess closures guiding them from their normal path of travel from the alignment chute for their return by gravity to the secondary support.

Referring to the drawings:

FIGURE 1 is a side view in elevation of one embodiment of the present invention illustrating a general arrangement of the principal features and mechanisms for automatic feeding apparatus as unitary apparatus arranged for feeding oriented dip tubed or applicator type closures into an alignment chute.

FIGURE 2 is a front view in elevation, taken along lines 2—2 of FIGURE 1, illustrating the positional relationship of the various parts, such as the primary and secondary supports, recirculating passage means, and means for raising random quantities of articles from the primary support to the secondary support, and also illustrates elevating means with projecting elements thereon, means for removing more than a single article from each projecting element on the elevating means, and also illustrates article positioning and, inverting means, and also illustrates one arrangement of an alignment chute means.

FIGURE 3 is a partial sectional view of FIGURE 1, taken along lines 3—3, illustrating means for inverting articles from the receiving element.

FIGURE 4 is a partial sectional view, taken along lines 4—4 of FIGURE 3, of the receiving element in perpendicular offset relation to the elevating means for receiving articles from the projecting elements.

FIGURE 5 is a partial sectional view of FIGURE 4 taken along lines 5—5 thereof, illustrating interrelation of the elevating means, projecting elements, and the receiver in the initial receipt by the receiver means of portions of the article on a projecting element and in the deposit of the remaining portions of the article on the receiving means, and also illustrates the means by which the projecting element departs its deposited article.

FIGURE 6 is a partial sectional view taken along lines 6—6 of FIGURE 2, illustrating arrangement of the primary and secondary supports, the electric motor drive arrangement for driving the elevating means, receiver and inverting means, and further illustrates in detail the means for removing articles in excess of one from a projecting element.

FIGURE 7 is a partial sectional view of FIGURE 3, taken along lines 7—7 thereof, illustrating a dip tubed closure in inverted position slidably disposed in an alignment chute wherein the said closure slidably rests on uppermost surface portions of the cap portion of the closure assembly with the operating button area thereof extending downwardly, and with the said closure cap being also guided therein between a pair of alignment chute members, by circumferential portions of exterior surfaces of its largest diameter, and further disposed therein with the normally underside surface portions of the said closure cap in spaced relation to the inside uppermost portions of the alignment chute.

FIGURE 8 illustrates overflow means provided in portions of the alignment chute for manually removing imperfect, misshapen, or deformed closures from said chute, and is taken along lines 8—8 of FIGURES 2 and 17, and further illustrates means to mechanically operate it as a supplementary overflow relief means on misoperation of the primary overflow relief means shown in FIGURES 15 and 19.

FIGURE 9 is a view similar to FIGURE 4, showing means for receiving closure assemblies from the projecting elements on the elevating means for transfer therefrom into an alignment chute without inverting said closure assemblies.

FIGURE 10 is a view similar to FIGURE 7, showing a dip tubed closure assembly in normal non-inverted position slidably disposed in alignment chute portions and is taken along lines 10—10 of FIGURE 9.

FIGURE 11 is a partial sectional view taken along lines 11—11 of FIGURE 3, illustrating means by which a dip tubed closure cap is captured from the said random quantity on the secondary support by entry of the head portion of a projecting element into underside shaped circumferential portions of a closure cap, and further illustrates exterior circumferential portions of the closure cap, and dip tube, in two point contact with the elevating means.

FIGURE 12 is a partial sectional view similar to FIGURE 11, illustrating means by which another, different article on said projecting element is in two point contact with the elevating means.

FIGURE 13 is a rear view in elevation, taken along lines 13—13 of FIGURE 6, showing the present invention adaptable, and operable in superposed relation, to one type of machine shown in phantom lines, for assembling dip tubed closures to cannisters, and further illustrates ideal use of the apparatus as a novel means of conserving floor space.

FIGURE 14, similar to FIGURE 2, is a front view in elevation of apparatus embodied in the present invention adapted for operation in offset relation to another type of machine, shown in phantom lines, for assembling dip tubed closures to cannisters.

FIGURE 15, is a plan view in elevation taken along lines 15—15 of FIGURES 2 and 17, of alignment chute portions primarily adapted for the gravity return of excess closures to the primary or secondary supports.

FIGURE 16 is a partial sectional view taken along lines 16—16 of FIGURE 15, and illustrates the general features of construction at the primary overflow relief portion of the alignment chute.

FIGURE 17 is a front view in elevation of another species of the present invention wherein an endless chain belt, having projecting elements in spaced relation attached thereto, is embodied as the elevating means for elevating individual ones of articles from random quantities thereof on the secondary support.

FIGURE 18 is a partial cross sectional view of FIGURE 17, taken along lines 18—18, showing in greater detail the tracking means for the endless chain belt elevating means as shown in FIGURE 17.

FIGURE 19 is a view similar to FIGURE 15 illustrating the addition of an air controlled diverting means to primary overflow relief portions of the alignment chute, such addition being useful and important to the overflow relief function of this portion of the alignment chute when extremely fragile or delicate articles, or fragile and delicate dip tubes are used in the apparatus.

In the aforesaid drawings, there is shown for purposes of exemplification, a preferred form of the best mode of embodiment of the present invention in which the principal features and mechanisms are employed in skillful form and manner; that is, all elements of the invention in motion during the normal operation thereof are powered by a single power source, or electric motor and main transmission unit, both of which are mounted on a main frame substantially in the rear of the elements in motion primarily as a safety means; the semi-conical configuration of the primary support permits its horizontal elongation for supporting comparatively large and indefinite quantities of articles to minimize frequent loading without effecting operational characteristics of the invention. The primary and secondary supports, and the elements normally in motion during the operation of the invention are easily accessible for maintenance purposes and the projecting elements on the elevating means are adjustable for handling like articles of different dimensions and, are easily accessible for replacement. The invention is not limited to the best mode of construction nor to the general modes of operative motion as shown on the drawings. Specifically shown as continuously rotative elements in normally operating continuous rotary motion, the apparatus as embodied herein is also operable wherein the random quantity pickup arm portion, shown in the general area of the primary support, functions equally well when arcuately reciprocated; the recirculating passageway between the secondary and primary supports could be exteriorly located connecting the said supports; or, additional agitation of the closures on the secondary support could be acquired with protuberances on the surface portion of the elevating means. These and other features will become apparent throughout the following specifications.

Referring to the drawings, FIGURES 1, 2, and 6, a feeding apparatus adapted for orienting and stacking aligned and like positioned dip tubed closures lifted from a primary support to an alignment chute is shown, generally comprising a support pedestal 10, a primary support 11, a secondary support 12, a scoop arm and drive arrangement 13, an elevating means 14, projecting elements 15 on said elevating means, positioning and clearing bristle brushes 16, rectifying cam 17, rotary receiver 18, retaining cam 19, inverting impeller wheel 20; and as shown in FIGURE 15 primary overflow relief portions 24 of the alignment chute; and as shown in FIGURE 8, secondary overflow relief portions 22a of said chute and secondary overflow operating means 23; and, as shown in FIGURE 6, variable speed motor driven transmission means 25.

More specifically, the general mode of construction is embodied in apparatus supported in substantially an obtuse angular position by a main frame and vertical pedestal base 10, to which is affixed an apertured face plate 27 of substantially a rectilinear plate construction. A secondary support 12 is in the form of a generally hollow, semi annular shaped member having its longitudinal axis perpendicular to the surface areas of the face plate 27. This secondary support 12, has a substantially smooth surface which is annularly formed and is affixed to the plate 27 in concentric alignment with lower circumferential portions of the aperture in the faceplate and is perpendicularly affixed thereto. It is further shaped to gradually terminate at its opposite extremities above the horizontal axial center of the aperture. A primary support 11 back plate 27a, having an upper extremity shaped to concentrically receive and fit snugly with the outermost edge surface of the shelf-like secondary support 12, is affixed thereto and extends downwardly at an obtuse angle towards the base of the apparatus in perpendicular relation to the secondary support 12 to terminate in a lower annularly shaped end which is dimensionally larger than the secondary support 12. On outermost edge 27b of the said back plate 27a adjacent the secondary support 12 extends tangentially from the annularly shaped portion thereof upwardly, parallel to the adjacent outermost face plate edge to terminate in edge alignment with the uppermost edge 12a of the secondary support 12. The opposite outermost edge of the back plate 27a is shaped to extend tangentially upward from the annular shaped lower portion thereof and angularly away from the face plate aperture. The primary support 11 is formed with a smooth inner surface of annular shape which is affixed to the outermost peripheral edge portions of the back plate 27a in perpendicular relation thereto, and an angularly disposed passageway wall 28 interconnects the face plate 27, the secondary support 12 and primary support back plate 27a. The said aperture in the face plate 27 peripherally surrounds a rotatable elevating means 14 in the general form of an annularly shaped disc 29 which is in surface alignment with the face plate 27 and which is positionally supported in relation thereto by the drive shaft 30 portion of the variable speed driving element 25. The elevating means disc 29, slidably inserted in the foresaid aperture in the faceplate, is motivated by the motor driven variable speed driving element 25, which element is supported by and is attached to the main frame pedestal 10 of the apparatus and is hidden from view by the face plate 27, the elevating means 29, secondary and primary supports 12, 11, and the primary support back plate 27a. The variable speed driving element 25 is of conventional design which includes an electric motor 31 driving a variable pitch pulley 32 as the rotative power source. The driving pulley is affixed to the hollow drive shaft 30. External portions of the drive shaft 30 slidably receive and support the elevating means 29. Internal shaft portions 32 of the drive shaft 30 drive a gear train to provide reverse rotative motion to the drive arrangement 33 for a scoop arm 13 in the primary support. The powered elevating means 29 thus is free to continuously rotate in one direction of rotation, while the scoop arm 13 rotates in a direction opposite the direction of rotation of the elevating means 29. Projecting elements 15, one of which is shown at 15 in FIGURE 11, are threadably affixed in lateral relation to front surface portions of the elevating means 29, close to the outer periphery of said means and are in the spaced peripheral relation to each other. Each projecting element 15 is of unitary construction comprising an annularly shaped threaded shank 35 with a smaller diameter neck, and a semispherical head 36 and is threadably affixed to the front surface portion of the elevating means 29 by means of the threaded shank and a locknut 37. A positioning element plate 17, of a substantially rectilinear shape having one longitudinal side surface 38 arcuately shaped in the general form of a rectifying cam 17 is affixed to, and in surface contact with, the face plate 27 and is positioned thereon so that the arcuately shaped side surface 38 of said cam is concentrically arranged to coincide with with the peripheral path of travel of the projecting elements 15 on the elevating means 29. Referring to FIGURES 2 to 5 inclusive, the said rectifying cam is also positioned on the rising side of the disc 29 in offset relation to the vertical axial centerline of the said disc 29. As shown in FIGURES 2, 3, and 5, the rectifying cam is for orienting the closure on each projecting element 15 so that portions of the dip tube adjacent underneath surfaces of the closure cap are radially aligned with the center of the disc 29. It is to be noted here, that in a closure assembly of the type described, the frictionally engaged dip tube and valve elements provide an axially aligned and rigid joint, approximately 1 inch in length, which extends from the said surfaces of the closure cap. The rectifying cam 17 is also for assuring the oriented position of the closure during entry of the aforesaid rigid joint part of the closure cap dip tube into a receiver element 18 of an inverting means. In general, the inverting means as shown in FIGURES 1, 2, and 3 comprises a transmission 42, a receiver 18, an impeller wheel 20, and an alignment chute 21. The transmission 42 is affixed to uppermost surface portions of the main frame 10 with its drive shaft 43 parallel to, and above the disc shaft 30 and the shaft 43 is further arranged to be in offset relation to the said disc shaft 30 on the descending side of the side disc. The inverting means shaft 43 is driven by the disc shaft 30 by mans of a chain belt drive 44. As means for receiving the dip tube of each oriented closure, an annularly shaped disc, in the general form of a receiver 18 having a series of radially arranged peripherally open pockets in the form of slots 41, is affixed to the said inverter transmission 42 on a branch shaft geared to the shaft 43 so that it is rotatable in a laterally spaced relation to the disk 29 for operation in cyclic timed relation to the projecting elements 15 on said disc 29. The receiver disc 18 is also at a level on the descending side of the elevating disc 29 slightly below the uppermost peripheral travel path of the said projecting elements. A pair of channel members 48 affixed in opposed spaced relation to each other as shown in FIGURES 7 and 10, on a plurality of transverse connectors (not shown on the drawings) in the general form of an alignment chute means 21, is for lifting individual closures from pockets formed by slotted portions 41 of the receiver element 18, and is for guiding them as they are slidingly lifted to a higher level, and further, is for guiding said closures in their sliding descent, by gravity, from said higher level in a predetermined path of travel to a discharge at a lower level. The alignment chute 21 is affixed to the transmission housing 42 of the inverting means and comprises arcuately formed portions 45 having a configurated cam entry means, secondary overflow relief safety means 22a, primary overflow relief means 24, and a reservoir and discharge portion 26. The arcuately formed portions 45 of the chute 21 are vertically disposed in a spaced tangential relationship to uppermost surface portions of the receiver 18 and are aligned with the annular travel path of the pockets formed by slots 41 in the receiver 18. An impeller wheel 20, comprising a plurality of radial blades 47 in circumferentially spaced relation to each other is affixed to the drive shaft 43 for rotation therewith in timed relation to the receiver 18 within the space defined by the spaced apart arcuately formed members 48 of the alignment chute 21, and is for lifting closures from the level of entry portions of the alignment chute to a higher level. The secondary overload relief safety means 22a is for preventing damage to the inverter transmission 42 on misoperation of the primary overload relief means 24, and is also for manually removing damaged or misshapen closures from the chute 21. The secondary relief 22a as shown in FIGURE 8, is linearly adjacent uppermost portions of the arcuately formed portion 45 of the alignment chute 21, and comprises an air gap 71 in the front member 48 of the said chute, and an arcuately movable separate portion 49 of the said member 48 affixed to an exteriorly journalled lever 22 for lateral movement, of the said portion 49, out of alignment with the chute member 48 against the action of a flat spring 70. On jamming of closures in the alignment chute, following closures forced into the secondary relief 22a under the action of the impeller blades 47, as shown in FIGURE 8, build or back up until the closure in the movable portion 49 is forced into misalignment to further force lateral arcuate movement of the lever 22 extremity into interfering relation with the annular travel path of spoke portions 23 of a spoke wheel 50 which is affixed, for continuous uninterrupted rotation, to the drive shaft 43 of the inverting means. The extremity of the lever 22, in said interfering relation is impinged by the said spoke portions 23, and under the action of said spokes, is forced to greater arcuate movement to completely open the gap 71 and to release the closure in the portion 49 of the secondary relief 22a for the return of said closure, by the impingement of following closures against it to ment of said spoke and said lever extremity, the portion 49 of the secondary relief 22a is returned to its normally aligned position in the chute member 48 under the action of the spring 70. The primary overload relief means 24 as shown in FIGURES 15 and 19 comprises an additional air gap 24a in the said chute member 48 at a lower level than the said gap 71, and is in the general form of a partial air bridge for partially guiding closures to reservoir portions 26 of the alignment chute 21 in their traversement of the air gap 24a in the chute member 48 when the momentum or velocity of the closures, descending from upper level portions of the chute, is insufficient for maintaining the alignment of the closures while they traverse the said gap 24a for entry into the reservoir portions 26 of the chute 21. When the reservoir is filled with closures, an excess closure impinges the last closure at the upper level portions of the reservoir, and tends to remain there in partial entrapment with the groove in the rear chute member 48 opposite said air gap. The partially trapped closure is forced, laterally, into the air gap 24a and out of its said entrapment by the accumulated weight of following excess closures, and returns by gravity to the secondary support. The tendency for a closure to remain entrapped, as described, is enhanced when the curved dip tube portion of the closure dangles above the rear chute member 48, at which position, the closure cap is tilted slightly upward against the said groove in the said chute member, to tend to partially trap itself. When the said dip tube dangles above the said air gap, the cap portion of the closure tends to tilt downwardly towards the secondary support, and is ejected therefrom by the impingement of following closures against it to fall by gravity to the secondary support.

In the normal operation of the apparatus as embodied in the present disclosure, and referring to FIGURES 1, 2, and 6, the moving elements of said apparatus are in continuous rotary motion whereby smaller random quantities of closure assemblies 40, 39, are lifted to the secondary support 12 from larger quantities thereof on the primary support 11 in periodic cyclic actions resulting from the actions of scoop blades or buckets 56, affixed to extremity portions of scoop arms 13, passing through the larger quantity while said quantity is in gravitational contact with the primary support back plate 27a. Individual ones of said smaller random quantity lifted to the secondary support are exposed to the elements 15 on the elevating means 14. The individual ones of the closure assemblies 39, 40, tend to disentangle from the smaller random quantity on the secondary support 12, as a partial result of the gentle agitation imparted to said random quantity by the actions of the projecting elements 15 in their passage through said smaller quantity, and from further gentle agitational effects of the smaller random quantity in gravity contact with the continuously rotating front surface of the elevating means 14, and by the further gentle agitation imparted by protuberances affixed to the front surface of the elevating means 14. The resulting effects of the foregoing agitations imparted to the smaller random quantity on the secondary support, includes the tendency for individual ones of said quantity to frictionally move along with the surface of the elevating means, with the dip tube portions 39 thereof substantially parallel therewith, and with the cap portions 40 of the closure cap directionally coincident with the rotational direction of the elevating means 14. The tendency for individual closure assemblies to align themselves in this manner ideally offers the shaped interior circumferential portions of the cap part 40 of the closure assembly for engagement with the head 36 of the projecting elements 15 which engage said cap to effectively drag the individual closure 39, 40, from the smaller random quantity to an upper level above the secondary support 12 where cleaning and positioning elements in the form of flexible annularly shaped bristled brushes 16 interiorly and exteriorly positioned on each side of the annular travel path of the projecting elements 15 rotatively remove all excess closures from each projecting element 15 in excess of one, and, at the same time position the dip tube portion 39, of any closure into general alignment with the adjacent following projecting element 15, or closure assembly 39, 40 interlocked thereon. The aforesaid cleaning and positioning elements 16 are provided in the apparatus as additional means for removing loosely connected dip tubes 39, or loosely fitting operating buttons 39a from imperfect valve assemblies, and to insure positional consistency of each closure on its related projecting element 15. The circumferential peripheral surface speed of the brushes 16 being greater than the peripheral speed of the surface of the elevating means 14, causes a momentary erratic movement of each closure assembly 39, 40, on its projecting element 15, which movement is immediately overcome by the combined effects of the cap portion 40 of the assembly and dip tube portion 39 thereof being in two point contact with surfaces of the elevating means 14. If the dip tube portion 39 of the closure assembly is missing, the aforesaid erratic movement of the closure cap 40 on its projecting element 15 causes the tubeless closure to drop by gravity from its projecting element 15 to the secondary support 12. After the closure assembly is exposed to the actions of the aforesaid brush elements 16, said assembly is elevated to a higher level where, referring to FIGURES 3 and 5, it is rotatably re-positioned on its projecting element 15 with the dip tube portion 39 thereof extending radially toward the axial center 30 of the elevating means 14 by the impingement of offset portions of the closure cap 40 on its projecting element 15 against orienting surface portions 38 of a rectifying cam 17 which is slidably lifted or moved from its normally spaced concentric relationship with the peripheral travel path of the projecting elements 15 as a partial result of the foregoing action, to allow the cap portion 40 to continue its rotative action on the head 36 on its projecting element 15, until the uppermost surface portions of the said cap 40 align longitudinally with the annularly shaped side surface portion 38 of the rectifying cam 17. The cam 17 rests by gravity on upper surface portions of the closure cap 40 and is slidably in contact with said cap portions until the dip tube portion 39, of the closure assembly moving slidingly in relationship to said cam and in a continuing path of elevation aligns with and enters the circumferential opening of a configurated slot 41 portion of the receiver 18. As shown at FIGURE 5, the cap portion 40 of the closure assembly is elevated further to its highest level on the elevating means 14 with the dip tube portions thereof 39 still in the slot 41 of the receiver 18. The element 18 being of smaller diameter has a circumferential surface peripheral speed different than the peripheral speed of travel of the projecting element 15, and the resultant actions tend to push the dip tube portion 39 slightly ahead of the cap portion 40 of the closure assembly pendant on its projecting element. The cap portion 40 of the closure assembly, above the receiver 18, descends as it continues in its annular path of travel, from its uppermost elevation down to the top surface portions of the receiver 18 which receiver is at a lower level than the level of the closure at its said uppermost elevation. Simultaneously with the foregoing, the dip tube 39 enters the area between the plate cam 19 which partially surrounds circumferential peripheral portions of the receiver 18, which cam is to prevent the dip tube portion 39 of the closure assembly from leaving the slot 41 in the receiver 18 while the cap portion 40 thereof is being lowered onto the surface of the said receiver 18 by the descending action of the projecting element 15 on the elevating means 14. The different speeds between portions of the receiver 18 and the projecting elements 15, allow the projecting element 15 to leave underside shaped lip portions of the closure cap 40 before the said receiver element carries the cap portion 40 away from the head 36 of its projecting element. The normally positioned closure assembly, now pendant on the uppermost surface portions of the receiver 18 with the dip tube portion 39 thereof extending into and through the slot 41 in the receiver 18, is transported by the receiver 18 into tangentially positioned cam entry openings of the alignment chute 21 as will be seen in FIGURES 3 and 4. The cap portion 40 of the closure assembly is slidably channeled into the said chute 21 by the action of the wall surface of the slot 41 against the dip tube portion 39 of the closure, which action continues until the said wall portion of the slot 41 departs the dip tube 39. The closure assembly pendantly rests in the lower reaches of the arcuately formed portion 45 of the chute 21 until it is slidingly lifted therein to a higher level in the chute 21 by the action of the rotating impeller wheel 20 and its blade elements 47. The arcuate elevation of the closure assembly 39, 40 in the chute inverts said assembly so that the dip tube portions 39 thereof are in an upward direction in the said chute 21 in which position each assembly 39, 40 is slidingly moved into terminal portions of the chute portions 45, and comes to rest therein, until a following closure assembly impinges the said assembly at rest and moves it slidingly into the secondary relief means as shown in FIGURE 8. The closure assembly descends, by gravity, in the chute 21 and into the primary overload relief portion 24 at a lower level in the chute 21 as shown in FIGURES 15 and 19. If the chute reservoir 26 is empty or partially empty, the momentum of closures in gravity descent from the safety means 22a carries them over the air bridge gap 52 portion of the chute member 48 and into the chute reservoir 26 assembly. If the said reservoir is full, the momentum of following closures from the chute 21 carries them into the air bridge gap 52 where they impinge the topmost closure cap 40 in the full chute. The excess closure comes to rest in partial entrapment with rear chute member 48 until the weight of following excess closures builds up to force it completely into the gap 24a for its return, by gravity, to the secondary support.

Referring to FIGURE 2, the frictional actions of the surface of the elevating means 14 tends to move an excess of the smaller random quantities of closures 39, 40 that may be on the secondary support 12 into a recirculating passageway 28 where said excess quantities or portions thereof return, by gravity, to the primary support 11. The general angular position of the apparatus elements as embodied in the present invention allows movement of the smaller random quantity down to and along the secondary support for surface contact by gravity with the elevating means, and also allows gravity movement of the larger random quantity along the primary support 11 to and down the back plate portion 27a thereof.

The novel features of construction of the present apparatus are skillfully embodied to adapt the invention for operation as a feeding apparatus in superposed relation to a closure assembly machine, as shown in FIGURE 13, wherein the alignment chute 26 guides aligned and like positioned aerosol valve assemblies to the actions of a feeding element portion of said assembly machine for assembling said closures, or valve assemblies to cannisters.

As shown in FIGURE 14, the apparatus as embodied in the present invention is adapted for operation in offset relation to another type of machine for assembling applicator type closures of the general type illustrated in FIGURE 12, to containers. When used in this relation, as shown in FIGURE 9, the impeller wheel 20, primary chute 21, and impeller wheel blades 47 are replaced with a single chute 26 tangentially arranged in superposed relation to the receiver 18 whereby closure assemblies 39, 40, from the projecting elements 15 on the elevating means 14 are placed on said receiver in the same manner as previously described, and are slidably forced into said alignment chute 26 in the same manner as previously described, with the dip tube 39 extending downwardly towards the secondary support 12. This adaption is ideally suitable when space over an assembly machine of the type mentioned prohibits the use of the apparatus of this invention in superposed relation to the machine as in FIGURE 13.

Another species contemplated by this invention is one embodying an endless chain belt, rather than a disc as shown at 29 having projecting elements 15 affixed to the link or pin portions of the chain 60 in spaced relation along the longitudinal centerline of the said chain. Such an elevating means is shown in FIGURES 17 and 18. Having a primary support 11, and a secondary support 12 similarly positioned as that previously explained, and adapted for operation with or without means for inverting articles, this chain embodiment is ideally useful for elevating individual articles, such as dip tubed closures, or applicator type closures from random quantities on a secondary support 12 from larger quantities on a primary support 11 where the said supports are operable below an assembly machine and whereby the endless chain belt operates upwardly from one to another floor level. The chain slidably moves in an endless trackway 58 recessed in a face plate surface 29a which also acts as a support for the pendant dip tubes 39 on the projecting elements 15 affixed to the links of the chain 60 which is driven by a sprocket wheel through a chain 44.

Referring to FIGURES 15 and 19, FIGURE 19 illustrates the adaption of a pressurized air controlled diverting mechanism 60a to the air bridge gap 24a in the alignment chute 26 as alternative primary relief means for positive removal of excess closures 39, 40, from the chute 21, when the reservoir chute 26 is full. The vertical side wall portions 26a and 26b of the reservoir chute are provided with opposing apertures at a level below the air gap 24a. An air pressure tube 63 inserted in one side wall portion 26a of the alignment chute aligns with an aperture 62 in the side wall portion 26b of the alignment chute. A diverting arm 64 pivotally affixed to an alignment chute portion 48 by means of trunnion block 65 at a higher level in relation to the air gap 24a, is pivotally suspended for lateral arcuate movement in relation to the alignment chute member 48 and comprises a diverting plate 66, a vane 67, a leaf spring 68, and a gage stop 69. The diverting arm 64 extends from its pivotal area above the air bridge gap 24a horizontally parallel to the alignment chute portion 26b to the aperture 62 in the chute portion 26b, where the arm 64 is provided with a vane 67 affixed thereto in position to receive the force of an air stream from an air source tube 63 affixed to the opposite chute portion 26a. A leaf spring 68 acts against the arm 64 and against the pressurized air from the air source tube 63. A diverting plate 66 affixed to the arm 64 arcuately rotates with the said arm to move it into and out of the normal path of travel of closure in their descent by gravity from upper level portions of the chute 21 to discharge portions of said chute at a lower level.

In operation, when the reservoir 26 is partially or completely empty, air pressure from the air source tube 63 impinges the vane 67 portion of the diverting arm 64 to arcuately rotate said diverting arm away from the alignment chute portion 26b, carrying with it, during its arcuate rotation, the diverting plate portion 66 of the arm 64. On interruption of the air pressure, the diverting arm 64 returns under the action of the leaf spring 68 carrying the diverting plate with it, to its original position at which position the said plate is in position to interrupt and guide excess closures out of the alignment chute and into the air gap 24a. When the alignment chute reservoir 26b is filled with closures, a following closure slides oin the trackway of the uninterrupted alignment chute member past the air gap 24a to enter the reservoir 26 and comes to rest in impinged relation to a closure at rest in upper portions of said reservoir. In this relation the said following closure is in interfering relation to the passage of compressed air from the tube 63 of the vane 67, and the diverting arm 64 returns to its aforesaid original position under the action of the leaf spring 68 at which position the diverting place diverts following excess closures from the alignment chute into the air gap 24a for their return by gravity to the secondary support.

In the present invention therefore, I have achieved the objectives as set forth and I claim:

1. Apparatus for elevating elongated articles having predominate annular recessed portions and axially projecting portions to an alignment chute comprising in combination: a semi-annular lower primary support inclined to the horizontal for a large quantity of random articles, a semi-annular higher secondary support inclined to the horizontal for receiving and containing a selected smaller random quantity of articles from said lower primary support, means for positioning said higher secondary support in offset relation above said lower primary support, means comprising a plurality of radial arms rotatable about an inclined to the horizontal axis disposed for engagement with articles on said primary support for transferring a selected random quantity of articles from said lower primary support to said higher secondary support, gravity re-cycle passage means for the return of excess articles from said secondary support to said primary support, elevating means disposed for engagement with articles on said secondary support rotatable about an inclined to the horizontal axis comprising a peripheral series of laterally projecting buttons on a rotatable support, said buttons being movably affixed in lateral relation to said rotatable support, means comprising a plurality of rotatable bristle brushes in lateral spaced relation on the ascending side of said rotatable support at a level higher than said secondary support for removing articles in excess of one from each button, re-positioning means affixed to the frame of the apparatus in position on the ascending side of said rotatable support at a level higher than said brushes for re-positioning the article suspended pendantly on each button, rotatable receiver means on the descending side of said elevating means at a level slightly below the highest level of peripheral travel of said buttons on the rotatable support for initially receiving a pendant portion of the individual article on each projecting button, then receiving remaining portions of the article for movement of said article out from said elevating means after said button has continued its descent to a lower level at which it descends away from the article depositing the same on said receiver for movement of said article into an alignment chute, the said receiver comprising a disc in lateral spaced relation to said elevating means having peripherally open slots, the said receiver being operable in cyclic timed relation to the buttons on the elevating means, said alignment chute comprising in general a pair of spaced apart members having oppositely grooved trackway surfaces for slidingly guiding articles in a predetermined path of travel in their descent by gravity from the level of said receiver to a discharge at a lower level, defining a space between said spaced apart members slidingly receiving upper and lower portions of elongated articles, and means for driving said elevating means, said receiver means, and said means comprising a plurality of radial arms in continuous uninterrupted rotary motion.

2. Apparatus as claimed in claim 1 and wherein said elevating means comprises a disc rotatable about a horizontally inclined axis within a stationary face plate flush with the disc surface, the said disc having an annular series of threadably affixed laterally projecting buttons, each button having an enlarged head for entering recessed circumferential portions of a randomly positioned article on the secondary support.

3. Apparatus as claimed in claim 1 and wherein inverting means are included for overturning individual articles following movement of said articles into said alignment chute by the receiver means.

4. Apparatus as set forth in claim 1 and wherein escape passage means are provided in said alignment chute, said escape passage means comprising a gap in one of the spaced apart members of said chute sufficiently large to permit lateral movement of excess articles from grooved trackway portions of the chute member opposite said gap under the action of succeeding articles when the part of the chute ahead is full with articles, the said gap being sufficiently small to allow successive articles to slidingly traverse said gap under their own momentum while being slidingly guided by grooved trackway portions of the chute member opposite said gap for their alignment into entry portions of the continuing alignment chute after their transversement of said gap, and wherein one of the spaced apart members of said chute includes safety means to prevent damage to the apparatus when articles are blocked against movement in said chute comprising a portion of one of said spaced apart members, at a level higher than said gap, initially yieldable under the pressure of succeeding articles acting against preceeding articles to partially open for partial escape of articles laterally from said chute, and a member operable in cycle with said receiver means to engage the said portion when it initially yields to complete the opening of said yieldable portion to completely release said article for its return by gravity to the secondary support, and means for the return of said portion to said alignment chute member after said member operable in cycle with said receiver disengages said chute portion.

5. Apparatus as claimed in claim 3 and in which said inverting means comprises upwardly curvilinear portions of said alignment chute from the level of said receiver to a higher level and means operable in unison cyclically with said receiver for positively advancing the articles successively through said upwardly curvilinear portions of said alignment chute and into continuing portions of said chute for their descent by gravity to a discharge at a lower level, the said chute having an escape passage means comprising a gap in one of the spaced apart members of said continuing portions of said chute at a lower level than the last-named higher level the said gap being sufficiently large to permit lateral movement of excess articles from grooved portions of the chute member opposite said gap under the action of succeeding articles when the part of the chute ahead is blocked or full of articles, the said gap being sufficiently small to allow successive articles to slidingly traverse said gap under their own momentum while being slidingly guided by grooved trackway portions of the chute member opposite said gap for their alignment with entry portions of the continuing alignment chute and wherein one of the spaced apart chute members includes safety means to prevent damage to the apparatus when articles in said chute at a level higher than said gap are blocked against movement in said chute comprising a portion of one of said members, at a level higher than said gap, initially yieldable under the pressure of succeeding articles acting against preceeding articles to partially open for partial escape of articles laterally from said chute, and a member operable in cycle with said receiver means to engage the said portion when it initailly yields to complete the opening of said yieldable portion and release said article for its return by gravity to the secondary support, and means for the return of said portion to said chute member after the member operable in cycle with said receiver disengages the yieldable chute portion.

6. Apparatus as claimed in claim 4 and which includes means movable by compressed air in one direction and by a spring in the opposite direction for positively diverting articles laterally from grooved trackway portions of the chute member opposite said gap into said gap for the return by gravity of excess articles to the secondary support when portions of the chute ahead are filled with articles, the said means comprising a lever journalled exteriorly to the chute member opposite said gap at a level higher than said gap and lineally extending from the journal alongside said member to an extremity at a level below said gap for lateral arcuate movement of diverter portions of said lever into diverting relation to the normal path of descent of articles in said alignment chute to divert the same laterally under the action of succeeding articles into said gap for their return by gravity to the secondary support, an aperture in each of the spaced apart alignment chute members in transverse alignment with each other and in alignment with said lever extremity for the unrestricted passage of an air jet across said normal path of descent of articles for movement of said lever and its diverting portions out of the normal path of descent of articles in said chute to allow articles to slidingly traverse said gap under their own momentum while being slidingly guided by grooved trackway portions of the chute member opposite said gap for their alignment with entry portions of the continuing alignment chute.

7. Apparatus for elevating elongated articles having predominate annular recessed portions and axially projecting portions individually to an alignment chute comprising in combination: a hopper that is inclined to the horizontal having an endless chain disposed for lateral engagement with articles in said hopper, said chain having laterally projecting movable buttons in lineal spaced relation along the pitch line of said chain for continuous uninterrupted movement along a trackway between the lower level of said hopper to a higher level above said hopper for selecting individual articles in random position on said buttons from the articles in said hopper for elevating the selected individual article to an alignment chute at a higher level, a stationary face plate at an inclined to the vertical position for supporting said hopper at said inclined to the horizontal position, a main frame for supporting said face plate in said inclined to the vertical position, means for driving said chain in continuous uninterrupted lineal motion, the said trackway having face plate surfaces on opposite sides of said trackway, orienting means for re-positioning the individual article on each button after the said article is selected from the articles in said hopper and means on the descending side of said endless chain for receiving at first a pendant portion of an article suspended pendantly on said buttons, then secondly for receiving remaining portions of the article for movement of the article out to an alignment chute after the said button has descended to a lower level away from said article, said alignment chute slidingly receiving articles from the receiving means and comprising in general a pair of spaced apart members having oppositely grooved trackway portions for slidingly guiding articles in their descent by gravity from the level of the receiving means to a discharge at a lower level and defining a space between said members for slidingly guiding upper and lower portions of elongated articles.

8. Apparatus as claimed in claim 7 wherein said means on the descending side of said endless chain for receiving at first a pendant portion of an article suspended pendantly on said buttons then secondly for receiving remaining portions of the articles for movement of the article out to an alignment chute, is in the general form of a plurality of radial outwardly open pocket means mounted for rotation in cyclic timed relation with said buttons for lateral movement of said article from the chain to said alignment chute.

9. Apparatus as claimed in claim 7 and wherein escape passage means are provided in said alignment chute, said escape passage means comprising a gap in one of the spaced apart members of said chute sufficiently large to permit lateral movement of excess articles from grooved trackway portions of the chute member opposite said gap under the action of succeeding articles when the part of the chute ahead is full with articles, the said gap being sufficiently small to allow successive articles to slidingly traverse said gap under their own momentum while being slidingly guided by grooved trackway portions of the chute member opposite said gap for their alignment with entry portions of the continuing alignment chute after the article traverses said gap, and wherein one of the spaced apart members of said chute includes safety means to prevent damage to the apparatus when articles are blocked against movement in said chute comprising a portion of one of said members, at a level higher than said gap, initially yieldable under the pressure of succeeding articles acting against preceding articles to partially open for partial escape of articles laterally from said chute, and a member operable in cycle with said chain to engage the said portion when it initially yields to complete the opening of said yieldable portion to completely release said article for its return by gravity to the hopper, and means for the return of said portion to said alignment chute after the member operable in cycle with said chain disengages said chute portion.

10. Apparatus as claimed in claim 7 and which includes a second hopper affixed beneath and in offset relation to the aforesaid hopper having an endless chain therein, a plurality of radial arms disposed for lateral engagement with a large quantity of articles on said second hopper and rotatable therein for elevating selected smaller quantities of articles to said hopper having an endless chain disposed therein, and means for driving said radial arms in continuous uninterrupted rotary motion on an inclined to the horizontal axis.

References Cited by the Examiner
UNITED STATES PATENTS

| | | | |
|---|---|---|---|
| 500,511 | 6/1893 | Richards | 221—166 X |
| 1,277,721 | 9/1918 | Havener | 221—166 |
| 1,718,565 | 6/1929 | Kingsbury et al. | 221—166 X |
| 2,487,352 | 11/1949 | McDaniel | 221—236 X |
| 2,543,244 | 2/1951 | Klooz et al. | 221—166 |
| 2,609,912 | 9/1952 | Engel | 221—163 X |
| 2,803,377 | 8/1957 | Wilson | 221—166 X |
| 2,844,979 | 7/1958 | Schiller et al. | |
| 2,855,113 | 10/1958 | Roske | 221—237 X |
| 2,889,960 | 6/1959 | Brancato et al. | 221—166 |
| 3,054,170 | 9/1962 | Benichasa et al. | 198—33.1 X |
| 3,058,618 | 10/1962 | Loveland et al. | 221—254 X |
| 3,079,042 | 2/1963 | Sterling | 221—14 |

RAPHAEL M. LUPO, *Primary Examiner.*

KENNETH N. LEIMER, LOUIS J. DEMBO, *Examiners.*